Jan. 27, 1959 J. W. WARING 2,871,306

INPUT COUPLING CIRCUIT

Filed Oct. 15, 1957 2 Sheets-Sheet 1

INVENTOR.
JOHN W. WARING

BY

ATTORNEY

INVENTOR.
JOHN W. WARING
BY
[signature]
ATTORNEY

United States Patent Office 2,871,306 Patented Jan. 27, 1959

2,871,306

INPUT COUPLING CIRCUIT

John W. Waring, Palmyra, N. J., assignor to Philco Corporation, Philadelphia, Pa., a corporation of Pennsylvania Application October 15, 1957, Serial No. 690,401

16 Claims. (Cl. 179—171)

This invention relates to input coupling circuits and more particularly to input coupling circuits for tunable amplifier stages. This application is a continuation-in-part of my application Serial No. 484,177, now abandoned.

Television sets designed to operate in the V. H. F. band assigned to television broadcasting generally employ a radio frequency amplifier stage which includes a parallel inductance-capacitance circuit the parallel resonant frequency of which can be adjusted as an aid in selecting a particular channel for reception. The input signal is generally supplied to this input stage from a fixed antenna array. For best results the antenna array and the transmission line connecting the antenna array to the amplifier stage should be balanced with respect to ground. For many reasons it is convenient and desirable to employ an amplifier element the input terminals of which are unbalanced with respect to ground. Therefore the input circuit must be so arranged that it can transform the balanced antenna circuit to an unbalanced circuit at the input terminals of the amplifier element.

In many instances, particularly in those instances where the television set is located at a considerable distance from the transmitting station, the signal reaches the antenna at a very low level. Fortunately random atmospheric noise is relatively low throughout the V. H. F. band so that the signal-to-noise ratio at the antenna is still relatively good even for very weak signals. In the absence of atmospheric noise the first amplifier stage becomes the primary source of noise in the amplified signal. In fact it is the noise generated in the first stage that limits the sensitivity of the receiver. This noise may be held at a minimum by proper design of the input circuit. For example it is known that the noise output of a vacuum tube amplifier stage is a function of the apparent source impedance of the circuit supplying a signal to the grid. It is also known that there is an optimum source impedance which will give a minimum noise figure for the amplifier. The value of this optimum source impedance decreases as the frequency of the signal to be amplified increases. In general, the optimum impedance will be different from the impedance presented by the antenna circuit. Therefore the input circuit should be arranged to transform the impedance presented by the antenna circuit to the optimum source impedance for the input stage at each frequency to which the input circuit may be tuned.

Single or multigrid tubes may be employed in the amplifier stage. The use of a triode in the first stage of the receiver avoids the partition noise of the pentode and other multigrid tubes. However, the use of the triode presents certain problems. In many instances the input stage is followed by a grounded grid or other low impedance input stage to further minimize the generation of noise in the early stages of the receiver. The relatively high grid-to-plate capacitance of the triode causes the grid circuit to be loaded by the relatively low input impedance of the following stage with a resultant loss of signal amplitude plus an undesired variation in the tuning of the input stages with changes in the bias on the first stage. This loading is reflected as a decrease in the signal-to-noise ratio of the amplified signal. Therefore the ideal input circuit employing a triode tube should include means for neutralizing the feedback through the grid-to-plate capacitance. Neutralization may not be required in circuits employing multigrid tubes or certain solid state amplifying devices because of the lower internal feedback from the output circuit to the input circuit.

In addition to performing the above functions the input circuit should assist in rejecting low frequency signals which may be picked up from such sources as the local oscillator, the intermediate frequency amplifier stages and the sweep circuits.

These and other functions of the input circuit must be accomplished in a minimum space and with as few parts as possible. The current practice is to employ a balun or elevator circuit to obtain the desired transformation from a balanced to an unbalanced circuit and from the impedance of the antenna circuit to something approaching the optimum source impedance. The balun usually comprises two or more open wire transmission lines wound together on one or more cores. In some instances the pitch of the windings or the spacing between conductors or both is made nonuniform in order to obtain the desired impedance transformation. Baluns are relatively difficult and costly to manufacture, they are difficult to mount on the receiver chassis, and they are not readily adjustable to compensate for variations in the characteristics of the balun itself or in other circuit elements associated therewith. Other types of input circuits employing conventional forms of transformers have been employed with only limited success.

Therefore it is an object of the present invention to provide a novel, economical input circuit for television sets or the like.

It is a further object of the invention to provide an input circuit with an improved noise figure.

Another object of the present invention is to provide an improved input circuit which does away with the need for baluns and other costly circuit elements.

In general the invention comprises a radio-frequency amplifier stage having a balanced input circuit comprising two input terminals. The amplifier stage also includes an electronic amplifier element having at least an input connection and a common connection between which signals to be amplified may be supplied. Inductive means and capacitive means are connected together for parallel resonance, the inductive means including means for providing different amounts of inductance in circuit with the capacitive means for selectively tuning the frequency of parallel resonance to different desired frequencies. The capacitive means comprises a plurality of series capacitances including two substantially equal capacitances connected symmetrically between respective ones of said input terminals and the respective opposite terminals of said inductive means. The circuit also includes means which couple one terminal of said inductive means to the input connection of the electronic amplifier element and additional means for maintaining the common connection of the electronic amplifier element at a voltage intermediate the voltage of the two input terminals with respect to radio frequency signals.

One specific embodiment of the invention comprises a tuning means providing, selectively, different values of inductance between first and second terminals thereof which is adjustable in steps or continuously as desired. One terminal of the tuning means is connected to the grid of an amplifier tube. Preferably means associated with said second terminal of said tuning means provides a capacitance to ground which is substantially equal to the input capacitance of the amplifier tube. A neutralizing capacitor is connected between the anode of the amplifier tube and the last mentioned terminal of the tuning means. The grid is returned to a suitable bias source such as an automatic gain control circuit. Impedance transformation, control of impedance with frequency and conversion from a balanced to an unbalanced circuit are achieved by connecting the antenna circuit to the tuning means through a suitable capacitor network. In the preferred forms of the invention a series circuit, comprising three or more capacitors, is connected in shunt with the tuning means. The antenna circuit is connected to suitable tapping points on the series circuit, the points being so chosen that the desired impedance transformation is achieved. The center point of the series capacitor circuit may be grounded. In addition, or alternatively, the two terminals of the antenna circuit may be connected to ground through equal discharge resistors. In a simplified embodiment of the invention the capacitor circuit in shunt with the tuning means is replaced by a single series capacitor between each terminal of the antenna circuit and a corresponding terminal of the tuning means.

For a better understanding of the invention together with other objects, features and advantages thereof reference should now be made to the following detailed description which is to be read in conjunction with the accompanying drawings in which:

Fig. 1 is a schematic circuit diagram of a preferred embodiment of the invention;

Figs. 2A and 2B, and 2C are equivalent circuits of the embodiment of Fig. 1;

Figure 1:
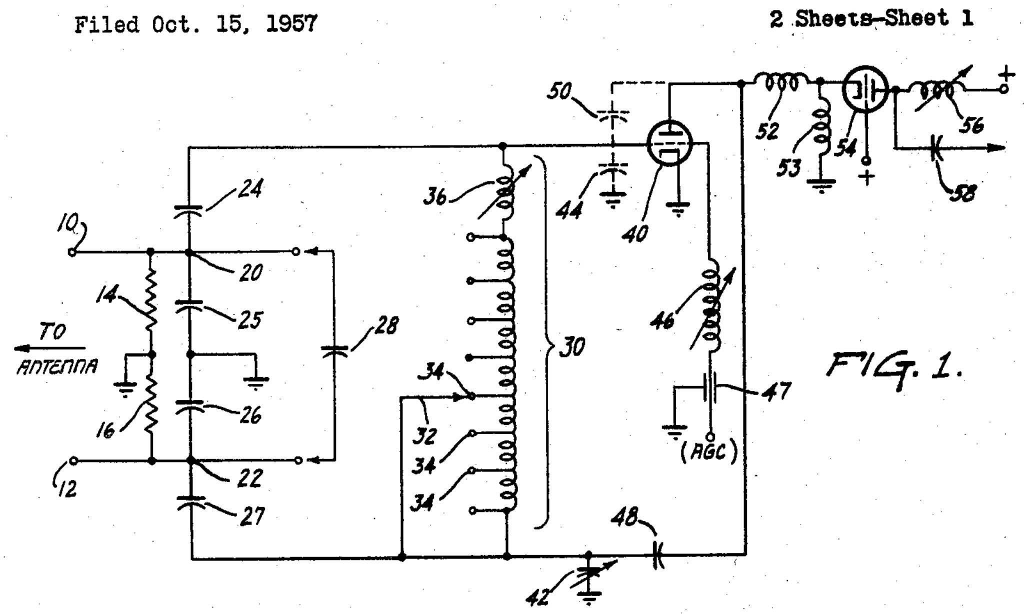

In Fig. 1 the terminals of the antenna circuit are shown at 10 and 12. The antenna circuit (not shown in Fig. 1) may comprise a folded dipole antenna and a parallel wire lead in. However, the invention may also be used with other forms of antennas and other types of lead ins having the same or different characteristic impedance.

Discharge resistors 14 and 16 are connected between ground and terminals 10 and 12, respectively. These resistors provide a direct current discharge path to ground from the antenna. Preferably these two resistors should be of equal value in order to preserve the balance with respect to ground of the antenna circuit. The actual resistance value of these resistors is not critical but it should be high with respect to the characteristic impedance of the antenna circuit. A value of 22 thousand ohms has been found to be satisfactory with a 300 ohm antenna circuit.

Terminals 10 and 12 are connected to intermediate points 20 and 22, respectively, of a series capacitor circuit including capacitors 24, 25, 26 and 27. An auxiliary capacitor 28 and means for connecting capacitor between intermediate points 20 and 22 are also shown in Fig. 1. Connected in shunt with this series capacitor circuit is the tuning inductor 30. Inductor 30 provides selectively different values of inductance so that the input circuit may be tuned to resonance at any one of several selected points in the spectrum. In the example shown in Fig. 1 the inductance of inductor 30 is varied by moving contact 32 to a selected one of taps 34. Contact 32 is connected to the lower end of inductor 30 and effectively shorts out the portion of the inductor 30 lying between the lower end and the selected tap. In a television receiver a tap is provided for each channel to be received. In the preferred form of the invention individual coils are provided between adjacent taps, the inductance of each coil being carefully chosen to provide the desired shift in the resonant frequency of the input circuit as the tap is moved from one tap to the next. Coil 36 is made adjustable and serves as a trimmer adjustment for the tuned circuit. In other preferred forms of the invention the inductor 30 is continuously tunable over a range of values that will give the desired change in the frequency to which the input is to be tuned, for example over both of the V. H. F. bands assigned to television broadcasting. The inductive tuning means may also take the form of the well known turret-type tuner in which individual coils of different value are selectively switched into the circuit. It may also take the form of a tapped inductor in which the unused portion of the inductance is not shorted but is left open-circuited. The common terminal of tuning inductor 30 and capacitor 24 is connected to the control grid of amplifier tube 40. A capacitor 42 is connected between ground and the common terminal of inductor 30 and capacitor 27. Preferably the capacitance of capacitor 42 is made equal to the input capacitance of tube 40. The input capacitance of tube 40 is represented in Fig. 1 by the capacitor 44. However, in an actual circuit it is made up of the effective grid-cathode capacitance of tube 40 and stray wiring capacitance of the grid circuit. Similarly some or all of the capacitance represented by capacitor 42 may be made up of stray circuit capacitances.

The control grid of tube 40 is connected to a suitable source of bias potential through an inductor 46. This source is indicated in Fig. 1 by the legend (AGC) which indicates that the bias source may provide an automatic gain control bias to the input stage. In the preferred form of the circuit, inductor 46 is tuned to resonate with the input capacitance 44 at a frequency below the lowest frequency to which the input circuit is to be tuned. This feature, which provides controlled neutralization of the input stage, is described and claimed in the copending application of Lynn Feathers, Serial No. 486,005, filed February 3, 1955. A feed through capacitor 47 is provided as a bypass to ground for the connection to the AGC supply.

A capacitor 48 is connected from the anode of tube 40 to the ungrounded terminal of capacitor 42 in order to provide neutralization of the feedback through the plate-to-grid capacitance as represented in Fig. 1 by capacitor 50.

Connection is made from the anode of tube 40 to the cathode of tube 54 through series inductor 52. A second inductor 53 is connected from the cathode of tube 54 to ground. Inductor 53 is chosen to resonate with the input capacitance of tube 54 and the output capacitance of tube 40 at a frequency near the lower end of the tuning range. Inductor 52 is chosen to tune the $\pi$ network made up of these two capacitances and inductor 52 at a frequency near the high end of the tuning range. It will be seen that this arrangement constitutes a cascode arrangement of tubes 54 and 40 with tube 54 arranged in a grounded grid stage. This cascode arrangement is not part of the invention per se but it does comprise a preferred form of connecting the novel input circuit to the following stages in the radio or television receiver. The connection to the third stage is by way of capacitor 58.

Turning now to the operation of the system of Fig. 1 it can be shown that the optimum source conductance $G_s$ for tube 40 is approximately equal to:

$$\sqrt{\frac{G_B+5G_t}{R_{eq}}}$$

where $G_B$ represents circuit losses, $G_t$ is the equivalent transit time loading of tube 40 and is approximately equal to $kf^2$ where $k$ is a constant and $f$ is the frequency of operation of the tube, and $R_{eq}$ an equivalent resistance of tube 40 which may be taken to be approximately equal to $2.5/g_m$ where $g_m$ is the transconductance of tube 40.

In a typical circuit the optimum source resistance, which is the reciprocal of $G_s$, may vary from approximately 900 ohms at channel 2 to approximately 300 ohms at channel 13. One of the main functions of the invention is to transform the substantially constant impedance of the antenna circuit to an apparent source impedance having the above variation with frequency.

Figure 2A:
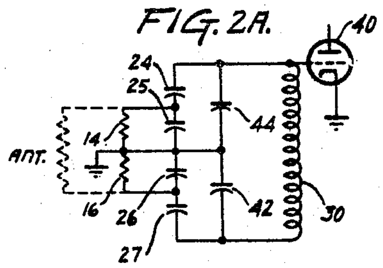
Figure 2B:
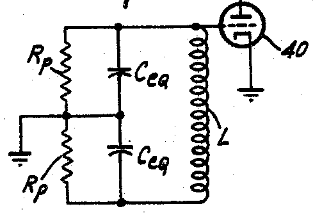
Figure 2C:
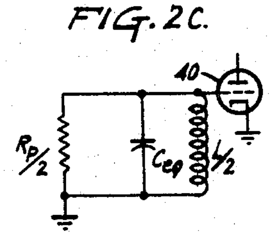

It can be shown that in the circuit of Fig. 1, the resistance of the antenna circuit appearing between terminals 10 and 12 may be represented as a resistance in shunt with tuning inductor 30. This equivalent resistance is in parallel with a parallel circuit comprising tuning inductor 30 and an equivalent capacitance determined by the values of capacitors 24 through 28 and 42 and the stray capacitance 44. Since inductor 30 is tuned to resonate with this capacitance, at the selected frequency of operation the parallel circuit will be a substantially infinite impedance in shunt with the equivalent shunt resistance. Therefore, at the frequency to which the input circuit is tuned, the source impedance is equal to one-half the equivalent shunt impedance. The factor 2 appears because of the transformation from the balanced to an unbalanced circuit. These relationships are illustrated in Figs. 2A, 2B and 2C which are equivalent circuits of the input circuit of Fig. 1. In Fig. 2A circuit components corresponding to like components in Fig. 1 have been given corresponding reference numerals. In Fig. 2B the individual circuit elements have been replaced by an equivalent parallel circuit.

If the losses in inductor 30 are neglected it can be shown that:

$$R_p=\frac{1}{\omega^2 C_{24}{}^2}+\frac{R^2}{4}\left[\frac{C_{24}+C_{25}}{C_{25}}\right]^2$$

where $R_p$ is the equivalent shunt resistance for one-half of the balanced circuit, R is the antenna resistance, and $C_{24}$ and $C_{25}$ are the capacitances of capacitors 24 and 25 (or 27 and 26) respectively. The losses in coil 24 and other circuit losses may be represented as an equivalent resistance in shunt with $R_p$. It will be found that the circuit of Fig. 2B may be transformed into the equivalent circuit of Fig. 2C which is the usual form of unbalanced circuit for driving the grid of a grounded cathode stage. Thus, at the frequency to which the input circuit is tuned, the apparent source impedance is equal to $R_p/2$.

The exact expression for $R_p$ or $R_p/2$ is not important.

The above expression for $R_p$ is included here to show that the apparent source impedance has a value determined by the values R, $C_{25}$ and $C_{24}$, and that the value of $R_p/2$ decreases with frequency. A comparison of the above expressions for $R_p$ and $G_s$ indicates that, in theory, $R_p/2$ decreases more rapidly with frequency than $1/G_s$. Experience has shown that the decrease in $R_p/2$ may be held to a value only slightly greater than the decrease in $1/G_s$. By proper choice of values $R_p/2$ may be made to approximate $1/G_s$ over the range from channel 2 to channel 13.

Figure 3:
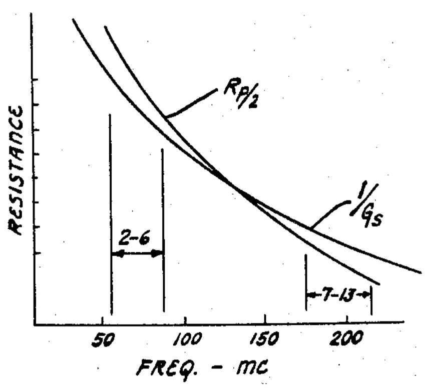
Fig. 3 is a plot illustrating the variation of apparent source impedance with frequency for one preferred arrangement of the embodiment of Fig. 1.

Fig. 3 is a plot showing in a general way the variation of $1/G_s$ and $R_p/2$ with frequency. In general, the values of capacitors 24 through 27 should be selected so that $R_p/2$ most nearly approximates $1/G_s$ over the desired tuning range. This generally involves balancing the deviations at the high and low ends of the tuning range.

Figure 4:
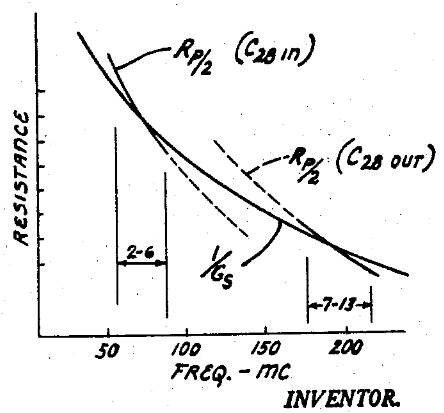
Fig. 4 is a plot illustrating the variation of apparent source impedance with frequency for a second preferred arrangement of the embodiment of Fig. 1.

As the equation for $R_p$ indicates, the curve $R_p/2$ may be shifted in the vertical direction by changing $C_{25}$ and $C_{26}$. Increasing $C_{25}$ and $C_{26}$ will tend to drop the curve. The value of $C_{25}$ and $C_{26}$ may be changed by connecting equal capacitors in shunt with capacitors 25 and 26 or by connecting the single capacitor 28 in shunt with both capacitors 25 and 26. Fig. 4 illustrates the effect of connecting capacitor 28 in the circuit for a selected portion of the tuning range. Note that the maximum deviation between curves $R_p/2$ and $1/G_s$ has been reduced. $R_p/2$ may be made to approach $1/G_s$ to any desired degree by switching in other capacitors at appropriate points in the tuning range. However, as stated above, excellent results have been obtained over the range from channel 2 to channel 13 without the use of auxiliary capacitor 28. If capacitor 28 is used in a television tuner the logical place for the switching to occur is between channels 6 and 7.

Tuning of the input circuit to a particular channel or station is accomplished by varying the inductance of tuning inductor 30. The capacitance in parallel with the tuning inductor usually varies as a function of frequency. Also, the stray capacitance of inductor 30 changes as the position of tap 32 is changed. Therefore the exact value of inductance to be included between adjacent taps is best determined experimentally. These same factors must be taken into account in selecting the individual coils of a turret-type tuner or the inductance between taps of a tuner in which the unused portion of the coils is not short-circuited. Inductor 36 may be varied to select the desired upper end of the tuning range. Capacitor 42 is in shunt with half of inductor 30 and may be employed to make minor variations in the tuning of the parallel circuit. However, under most conditions adjustments of capacitor 42 should be limited to those necessary to improve the balance of the circuit. As mentioned above, the optimum value of capacitor 42 is approximately equal to the distributed capacitance 44.

Feedback takes place from the anode to the control grid of tube 40 through the grid-to-plate capacitance 50. This is a form of negative feedback which reduces the effective amplitude of the input signal. It also changes the apparent input capacity of the tube due to the so-called Miller effect. This negative feedback is overcome by connecting neutralizing capacitor 48 from the anode of tube 40 to the opposite side of the balanced circuit. This arrangement causes substantially equal signals of the same phase to be impressed on opposite sides of the balanced circuit. The signal fed back through capacitor 48 is reflected as a signal of opposite phase at the other side of the balanced circuit, that is at the grid of tube 40. This signal of opposite phase cancels the signal fed back through the grid-to-plate capacitance 50 and the dependence of the apparent input capacitance on gain due to the Miller effect is thereby eliminated.

As explained in the above-mentioned copending application, a single neutralizing capacitor 48 has a tendency to over-neutralize at lower frequency. This tendency is overcome in the circuit of Fig. 1 by tuning the blocking inductance 46, which isolates the bias circuit from the input signal, to resonate with the input capacitance 44 at a frequency just below the lower limit of the tuning range.

The low frequency rejection of signals picked up by the antenna results from the fact that at low frequencies, that is of the order of a few megacycles and below, inductor 30 is substantially a short circuit. Therefore, both a positive signal appearing at terminal 10 and the corresponding negative signal appearing at terminal 12 will be applied directly to the grid of tube 40 resulting in a cancellation of the interfering signal in the input circuit. Inductor 46 also assists in the rejection of low frequency signals since the impedance from grid to ground by way of this inductor is low for low frequencies.

The signals appearing at the anode of tube 40 are applied directly to the cathode of tube 54 through the cascode connection. The grid of tube 54 is held at a fixed potential so a net signal results between grid and cathode. An amplified version of the signal appears across load impedance 56. The connection to the following stages of the receiver is by way of capacitor 58.

Figure 5:
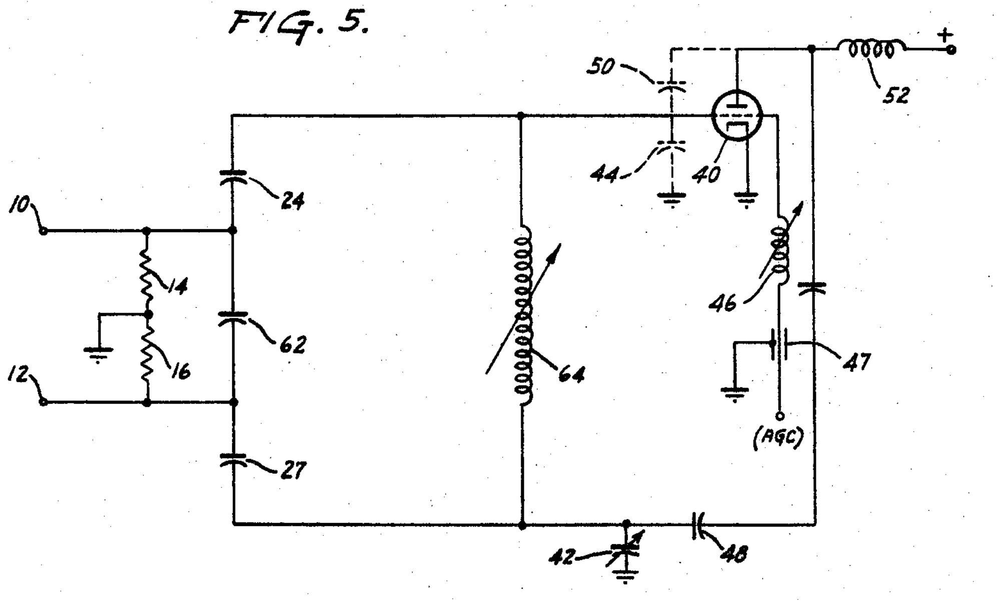
Fig. 5 is a schematic circuit diagram of a second embodiment of the invention.

Fig. 5 shows a second embodiment of the invention in which capacitors 25 and 26 of Fig. 1 are replaced by a single capacitor 62. This modification saves one capacitor and the time required to connect it in the circuit and for this reason it has a competitive advantage over the circuit of Fig. 1. The antenna circuit remains balanced with respect to ground by virtue of capacitor 42 and capacitance 44 which correspond to similarly numbered elements in Fig. 1. The circuit of Fig. 5 has the disadvantage that the capacity actually connected to ground has been reduced. Therefore any change in the capacitance 44 or of the capacitance of the tuning means with respect to ground will tend to unbalance the input circuit of Fig. 5 to a greater extent than it would the circuit of Fig. 1. Therefore the inductance of the tuning means 64 should be changed in a manner that will minimize changes in the capacitance with respect to ground as the tuning is varied. This suggestion should not be taken as an indication that a tapped tuning inductor of the type shown in Fig. 1 cannot be used in the circuit of Fig. 5. As a practical matter in a commercial television receiver a tapped tuning inductor may be used in the circuit of Fig. 5. However, as indicated above, due consideration should be given to the possibility of unbalance in the antenna circuit.

Figure 6:
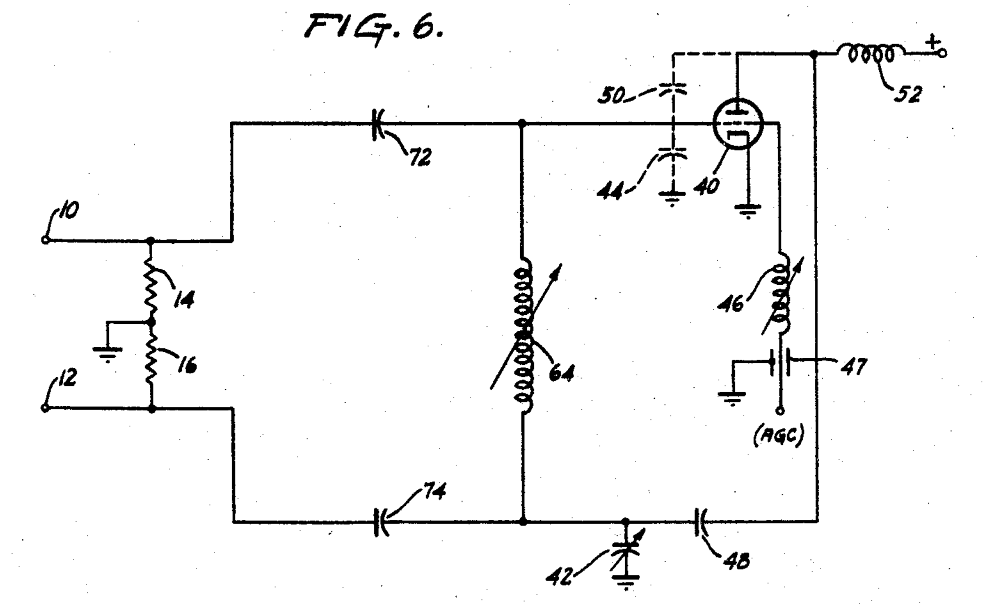
Fig. 6 is a schematic circuit diagram of still another embodiment of the invention.

Fig. 6 shows still another embodiment of the invention. In the circuit of Fig. 6 the capacitors 24 through 27 of Fig. 1 have been replaced by the two series capacitors 72 and 74. The equivalence of the circuits of Fig. 6 and Fig. 1 may be shown as follows. At any one frequency the parallel combination of resistor 14 and capacitor 25 may be replaced by an equivalent series resistance and an equivalent series capacitance. This equivalent capacitance is in series with capacitor 24 so these two elements may be replaced by the single capacitor 72. A similar transformation may be performed for capacitors 26 and 27. In theory the value of capacitors 72 and 74 should vary as a function of the frequency to which the input circuit is tuned. As a practical matter it has been found that capacitors may have a fixed value, the only departure from optimum operation being a slightly more rapid decrease in the apparent source impedance than is found in the circuit of Fig. 1. A partial explanation of this is that there is always some stray capacitance to ground from terminals 10 and 12 so that the circuit of Fig. 6 retains some of the characteristics of the circuit of Fig. 1. It has been found that a production model of the circuit of Fig. 6, employing the usual tapped tuning inductor, had a lower noise figure and a better over-all performance over the range from television channel 2 to television channel 13 than the more expensive balun type input circuit formerly employed. The relative simplicity of the circuits of Figs. 1, 5 and 6, and the fact that they do not require custom wound baluns and the like, makes it possible to change the design of the input circuit to accommodate different tubes, for example pentode tubes in the first stage or different antennas of different impedances, for example stacked arrays of folded dipoles with appropriate directors and reflectors.

Throughout the specification frequently reference has been made to television receivers. However, it should be understood that this invention is equally applicable to frequency modulation receivers, amplitude modulation receivers whether commercial, military or for home use. Furthermore the invention is not limited to receivers operating in any particular region of the frequency spectrum. However at low frequencies, where the noise generated in the input stage is not a major factor in determining the maximum sensitivity of the receiver, certain advantages of the novel input circuit, for example the transformation of the antenna impedance to optimum source impedance, are not as important as at V. H. F. but the remaining features of the invention make it useful at low frequencies.

What is claimed is:

1. A tunable amplifier stage provided with first and second input terminals which are balanced with respect to ground, said amplifier stage comprising a vacuum tube having at least a cathode, an anode and a control grid, said cathode being so connected to ground as to maintain said cathode at a potential intermediate the potentials of said first and second input terminals with respect to radio frequency energy, a load impedance connected between said anode and a source of anode potential, tuning means providing, selectively, different values of inductance between first and second terminals thereof, the effective inductance values of said tuning means being such as to tune said stage selectively to a plurality of selected frequencies, said tuning means having said first terminal thereof coupled to said control grid, a capacitor coupled between a point of reference potential and said second terminal of said tuning means, said capacitor having a capacitance substantially equal to the input circuit capacitance of said vacuum tube, and an impedance transformation circuit coupled to said first and second input terminals and said first and second terminals of said tuning means, said impedance transformation circuit comprising a second capacitor coupled between said first input terminal and said first terminal of said tuning means at each of said selected frequencies, a third capacitor coupled between said second input terminal and said second terminal of said tuning means at each of said selected frequencies, said second and third capacitors being of substantially equal capacitance, and means including at least the stray capacitances of said circuit providing a net capacitive impedance between said first and second input terminals at said selected frequencies, said impedance transformation circuit resonating with said inductor to tune said stage to said selected frequencies, the capacitance of said first and second capacitors being selected so that the apparent source impedance as seen from said grid-cathode circuit decreases with frequency at approximately the same rate as the optimum source impedance of said amplifier for a selected mode of operation thereof.

2. A tunable amplifier stage adapted for connection to a source of signal provided with first and second terminals which are balanced with respect to ground, a vacuum tube having at least a cathode, an anode and a control grid, said cathode being so connected to ground as to maintain said cathode at a potential intermediate the potentials of said first and second terminals of said source with respect to intermediate frequency energy, said anode being returned to a source of anode potential through a load impedance, tuning means providing, selectively, different values of inductance between first and second terminals thereof, said tuning means having said first terminal thereof coupled to said control grid, a capacitor having a capacitance substantially equal to the input capacitance of said vacuum tube connected between a point of reference potential and said second terminal of said tuning means, whereby the impedances to ground from said two terminals of said tuning means are substantially equal to each other, and an impedance transformation circuit coupled between said first and second terminals of said source and said first and second terminals of said tuning means, said impedance transformation circuit resonating with said tuning means to tune said stage to different desired frequencies corresponding to said different values of inductance, said impedance transformation circuit comprising a second capacitor coupled between said first terminal of said source and said first terminal of said tuning means, a third capacitor coupled between the second terminal of said source and a second terminal of said tuning means, said second and third capacitors being of substantially equal capacitance, and a capacitive network connected between said first and second terminals of said source, said capacitive network being arranged to have, selectively, first and second values of capacitance, said second and third capacitors having capacitances such that the apparent source impedance as seen from said grid-cathode circuit of said vacuum tube varies with frequency at substantially the same rate as the optimum source impedance of said vacuum tube, said capacitive network having impedances such that said apparent source impedance is equal to said optimum source impedance at first and second spaced points in the tuning range of said amplifier corresponding, respectively, to said first and second values of capacitance.

3. A tunable amplifier stage adapted for connection to a source of signal provided with first and second terminals which are balanced with respect to ground, said amplifier stage comprising a vacuum tube having at least a cathode, an anode and a control grid, said cathode being returned to a point of fixed reference potential, said anode being returned to a source of anode potential through a load impedance, tuning means providing, selectively, different values of inductance between first and second terminals thereof, said tuning means having said first terminal thereof coupled to said control grid, means associated with said second terminal of said tuning means providing a capacitance to ground which is substantially equal to the input capacitance of said vacuum tube, whereby the impedances to ground from said two terminals of said tuning means are substantially equal to each other, and an impedance transformation circuit coupled between said first and second terminals of said source and said first and second terminals of said tuning means, said impedance transformation circuit comprising a first capacitor coupled between said first terminal of said source and said first terminal of said tuning means, a second capacitor coupled between the second terminal of said source and the second terminal of said tuning means, said first and second capacitors being of substantially equal capacitance, and means providing at least some capacitance between said first and second terminals of said source, the capacitance of said first and second capacitors and the impedance of said last-mentioned means being such that the value of the expression:

$$\frac{1}{\omega^2 C_1{}^2}+\frac{R^2}{4}\left(\frac{C_1+C_2}{C_2}\right)^2$$

approximates the value of the expresison:

$$\sqrt{\frac{R_{eq}}{G_B+5G_t}}$$

throughout a selected portion the tuning range of said amplifier stage where:

$\omega=2\pi f$
$C_1$=capacitance value of said first capacitor
$R$=resistance of said source as seen from said first and second terminals thereof
$C_2$=net capacitance between said first and second terminals of said source
$R_{eq}$=equivalent resistance of said vacuum tube
$G_B$=circuit losses, and
$G_t$=equivalent transit time loading of said vacuum tube.

4. An amplifier stage which is tunable in steps over the two V. H. F. bands assigned to television broadcasting, said amplifier stage being adapted for connection to a source of signal provided with first and second terminals which are balanced with respect to ground, said amplifier stage comprising a vacuum tube having at least a cathode, an anode and a control grid, said cathode being returned to a point of fixed reference potential, said anode being returned to a source of anode potential through a load impedance, tuning means providing, selectively, different values of inductance between first and second terminals thereof, said values of inductance varying in steps, said tuning means having said first terminal thereof coupled to said control grid, a capacitor having a capacitance substantially equal to the capacitance from the grid of said vacuum tube to said point of reference potential coupled between a point of reference potential and said second terminal of said tuning means, and an impedance transformation circuit coupled between said first and second terminals of said source and said first and second terminals of said tuning means, said impedance transformation circuit comprising a second capacitor coupled between said first terminal of said source and said first terminal of said tuning means, a third capacitor coupled between said second terminal of said source and said second terminal of said tuning means, said second and third capacitors being of substantially equal capacitance, and means including at least a capacitor connected between said first and second terminals of said source, said second and third capacitors having capacitances such that the apparent source impedance as seen from the grid-cathode circuit of said vacuum tube undergoes substantially the same variation with frequency as the optimum source impedance for said tube, the value of capacitance of said means connected between said first and second terminals of said source being selected so that said apparent source impedance is equal to said optimum source impedance at a frequency intermediate the two extreme frequencies of said two V. H. F. television bands.

5. An amplifier stage which is tunable in steps over the two V. H. F. bands assigned to television broadcasting, said amplifier stage being adapted for connection to a source of signal provided with first and second terminals which are balanced with respect to ground, said amplifier stage comprising a vacuum tube having at least a cathode, an anode and a control grid, said cathode being returned to a point of fixed reference potential, said anode being returned to a source of anode potential through a load impedance, tuning means providing, selectively, different values of inductance between first and second terminals thereof, said values of inductance varying in steps, said tuning means having said first terminal thereof coupled to said control grid, a capacitor having a capacitance substantially equal to the input capacitance of said vacuum tube coupled between said second terminal of said tuning means and a point of reference potential, and an impedance transformation circuit coupled between said first and second terminals of said source and said first and second terminals of said tuning means, said impedance transformation circuit comprising a second capacitor coupled between said first terminal of said source and said first terminal of said tuning means, a third capacitor coupled between said second terminal of said source and said second terminal of said tuning means, said second and third capacitors being of substantially equal capacitance, and a capacitor network connected between said first and second terminals of said source, said capacitor network being arranged to have selectively first and second values of capacitance, said second and third capacitors having capacitances such that the apparent source impedance as seen from the grid-cathode circuit of said electron tube undergoes substantially the same variation with frequency as the optimum source impedance for said tube, the first and second values of capacitance of said capacitor network being selected so that said apparent source impedance is equal to said optimum source impedance at a frequency in the lower V. H. F. television band and at a frequency in the upper V. H. F. television band, respectively.

6. In combination with a signal source having first and second output connection points which are balanced with respect to ground, a tunable amplifier stage comprising a vacuum tube having at least an anode, a cathode, and a control grid, said cathode being returned to ground at the frequency of the signals supplied by said source, said anode being returned to a source of anode potential through a load impedance, said amplifier stage having a minimum noise figure when said vacuum tube is supplied from a source which has an impedance of optimum value at each frequency, said optimum value normally decreasing as the frequency to which said stage is tuned increases, tuning means providing, selectively, different values of inductance between first and second terminals thereof, said tuning means having said first terminal thereof connected to said control grid, a capacitor having a capacitance substantially equal to the input capacitance of said tube connected between ground and said second terminal of said tuning means, a second capacitor coupled between the first of said two connection points and said control grid, a third capacitor coupled between the second of said two connection points and said second terminal of said tuning means, said second and third capacitors being of substantially equal capacitance, and an impedance network coupled between said first and second connection points, a center point of said impedance network being returned to ground, the value of said second and third capacitors and said impedance network being so chosen that the apparent source impedance as seen from the grid-cathode circuit of said tube varies with frequency at approximately the same rate as the optimum source impedance, the impedance of said impedance network being selected so that said apparent source impedance is substantially equal to said optimum source impedance at at least one point within a selected frequency range over which said amplifier stage may be tuned.

7. An amplifier stage in accordance with claim 6 wherein said impedance network comprises first and second equal resistors connected between said first and second connection points, respectively, and ground and a capacitor network including at least one capacitor connected in shunt with said resistors.

8. An amplifier stage in accordance with claim 7 wherein said last-mentioned capacitor network comprises a single capacitor connected between said first and second connection points.

9. An amplifier stage in accordance with claim 7 wherein said capacitor network comprises two equal capacitors connected in series between said two connection points, the junction point of said two capacitors being returned to ground.

10. A tunable radio-frequency amplifier stage for providing a frequency-variable, balanced-to-unbalanced impedance transformation, said stage comprising first and second ungrounded input terminals, means connected between said first and second terminals respectively and ground, the impedance from said first input terminal to ground being capacitive at the selected frequencies of operation of said amplifier stage, the impedance from said second input terminal to ground being capacitive and substantially equal to said impedance from said first terminal to ground at corresponding selected frequencies of operation of said amplifier stage, first and second two-terminal circuit means providing substantially equal capacitances at said selected frequencies of operation, each of said circuit means having one terminal connected to a different one of said input terminals thereby to provide a series circuit, inductive means connected in parallel with said series circuit for parallel resonance, said inductive means including means for providing different amounts of inductance in circuit with the series circuit for selectively tuning the frequency of parallel resonance to said selected frequencies, an electronic amplifier element having an input connection, an output connection and a common connection and adapted to receive an input signal between said input connection and said common connection and to provide an output signal between said output connection and said common connection, said common connection being so connected to ground as to maintain said common connection at a fixed potential with respect to ground at said selected frequencies of operation, one end terminal of said series circuit being connected to said input element with a low impedance connection at said selected frequencies, and means connected between the other end terminal of said series circuit and ground for effectively balancing such reactance as is presented between said input connection and said common connection of said electronic amplifier element, the impedance between said input terminals and the impedance of said two-terminal circuit means being so selected that the apparent source impedance, as seen from the input of said amplifier element, decreases for increasing values of selected frequencies.

11. A tunable radio-frequency amplifier stage for providing a frequency-variable, balanced-to-unbalanced impedance transformation, said stage comprising first and second ungrounded input terminals, means connected between said first and second terminals respectively and ground, the impedance from said first input terminal to ground being capacitive at the selected frequencies of operation of said amplifier stage, the impedance from said second input terminal to ground being capacitive and substantially equal to said impedance from said first terminal to ground at the corresponding selected frequencies of operation of said amplifier circuit, first and second substantially equal capacitances, each having one terminal connected to a different one of said input terminals, thereby to provide a series circuit, inductive means connected in parallel with said series circuit for parallel resonance, said inductive means including means for providing different amounts of inductance in circuit with the series circuit for selectively tuning the frequency of parallel resonance to said selected frequencies, an electron amplifier tube having at least an anode, a cathode and a control grid, said cathode being so connected to ground as to maintain said cathode at a fixed potential with respect to ground at said selected frequencies of operation, one end terminal of said series circuit being connected to said control grid through a low impedance connection at said selected frequencies and means connected between the other end terminal of said series circuit and ground for effectively balancing such reactance as is presented between said control grid and said cathode, the impedance between said input terminals and the value of said first and second capacitances being so selected that the apparent source impedance as seen from the grid-cathode circuit decreases for increasing values of selected frequencies.

12. A low-noise, tunable, radio-frequency amplifier stage for providing a frequency-variable, balanced-to-unbalanced impedance transformation, said stage comprising first and second ungrounded input terminals, means connected between said first and second terminals respectively and ground, the impedance from said first input terminal to ground being capacitive at the selected frequencies of operation of said amplifier stage, the impedance from said second input terminal to ground being capacitive and substantially equal to said impedance from said first terminal to ground at the corresponding selected frequencies of operation of said amplifier circuit, first and second substantially equal capacitances each having one terminal connected to a different one of said input terminals thereby to provide a series circuit, inductive means connected in parallel with said series circuit for parallel resonance, said inductive means including means for providing different amounts of inductance in circuit with said series circuit for selectively tuning the frequency of parallel resonance to said selected frequencies, an electron amplifier tube having at least an anode, a cathode and a control grid, said cathode being so connected to ground as to maintain said cathode at a fixed potential with respect to ground for said selected frequencies of operation, said control grid being connected substantially directly to one end terminal of said series circuit at said selected frequencies of operation, and reactance means connected between the other end terminal of said series circuit and ground for effectively balancing the capacitance in the grid-cathode circuit of said electron tube, said first and second capacitances having values such that the apparent source impedance as seen from the grid-cathode circuit decreases with increasing values of said selected frequencies at approximately the rate of decrease of the optimum source impedance of said electron tube for low-noise operation, the value of capacitance between said two input terminals being selected so that said apparent source impedance is at least approximately equal to said optimum source impedance at an intermediate one of said selected frequencies of operation.

13. An amplifier stage in accordance with claim 12 wherein said amplifier stage further comprises a feedback neutralizing reactance means connected between said anode of said electron tube and said other end terminal of said series circuit.

14. A tunable radio-frequency amplifier stage for providing a frequency-variable, balanced-to-unbalanced impedance transformation in the input circuit thereof, said stage having a balanced input circuit comprising first and second ungrounded input terminals, said amplifier stage further comprising a vacuum tube having at least a cathode, an anode and a control grid, tuning means for selectively providing different values of inductance between first and second terminals thereof, said tuning means having said first terminal thereof coupled to said control grid, means providing at least some capacitance between said second terminal of said tuning means and a point of reference potential, means including plural series capacitances coupled between said first and second terminals of said tuning means, said plural series capacitances comprising a first lumped-constant capacitor coupled between said first input terminal and said first terminal of said tuning means at selected frequencies to which said stage may be tuned to parallel resonance by said tuning means and a second lumped-constant capacitor coupled between said second input terminal and said second terminal of said tuning means at each of said selected frequencies, said means including plural series capacitances further comprising means connected between said first and second input terminals, said last-mentioned means, together with the stray capacitances of said circuit, providing a net capacitive impedance between said input terminals at each of said selected frequencies, said cathode being so connected to said last-mentioned means as to maintain said cathode at a potential intermediate the potential of said first and second input terminals with respect to radio frequency energy, the capacitances of said first and second lumped-constant capacitors being selected to have a value such that the apparent source impedance, as seen from the grid-cathode circuit of said vacuum tube, decreases with increasing operating frequency at approximately the same rate as the decrease in optimum source impedance for said vacuum tube for a selected mode of operation thereof, the net capacitive impedance between said input terminals being selected to be such that said apparent source impedance is at least approximately equal to said optimum source impedance for said selected mode of operation of said amplifier stage at an intermediate one of said selected frequencies.

15. An amplifier stage in accordance with claim 14 wherein said means providing said net capacitive impedance between said two input terminals includes a single capacitor connected between said input terminals.

16. An amplifier stage in accordance with claim 14 wherein said means providing said net capacitive impedance between said two input terminals comprises two additional capacitors of equal value connected between said first and second input terminals, respectively, and ground.

References Cited in the file of this patent

UNITED STATES PATENTS

| | | |
|---|---|---|
| Re. 22,993 | Alford | Apr. 20, 1948 |
| 2,467,778 | Redmond | Apr. 19, 1949 |
| 2,630,558 | Arsem et al. | Mar. 3, 1953 |
| 2,806,945 | Wingert | Sept. 17, 1957 |

FOREIGN PATENTS

| | | |
|---|---|---|
| 850,206 | France | Sept. 4, 1939 |
| 852,560 | Germany | Oct. 16, 1952 |